US011955750B2

(12) United States Patent
Kobayashi et al.

(10) Patent No.: US 11,955,750 B2
(45) Date of Patent: Apr. 9, 2024

(54) JOINT CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hiroki Kobayashi, Mie (JP); Hajime Kawase, Mie (JP); Masaaki Tabata, Mie (JP); Teruo Hara, Mie (JP); Hajime Matsui, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 375 days.

(21) Appl. No.: 17/601,660

(22) PCT Filed: Apr. 2, 2020

(86) PCT No.: PCT/JP2020/015214

§ 371 (c)(1),
(2) Date: Oct. 5, 2021

(87) PCT Pub. No.: WO2020/209177

PCT Pub. Date: Oct. 15, 2020

(65) Prior Publication Data

US 2022/0181822 A1 Jun. 9, 2022

(30) Foreign Application Priority Data

Apr. 10, 2019 (JP) ................................ 2019-074919

(51) Int. Cl.
*H01R 13/639* (2006.01)
*H01R 4/16* (2006.01)
(Continued)

(52) U.S. Cl.
CPC ............ *H01R 13/639* (2013.01); *H01R 4/16* (2013.01); *H01R 4/183* (2013.01); *H01R 25/162* (2013.01)

(58) Field of Classification Search
CPC ........ H01R 13/639; H01R 4/16; H01R 4/183; H01R 25/162; H01R 4/2495; H01R 13/5833; H01R 31/08
See application file for complete search history.

(56) References Cited

U.S. PATENT DOCUMENTS 4,195,898 A * 4/1980 Chow .................... H01R 13/58
439/407
4,597,622 A 7/1986 Coe
(Continued)

FOREIGN PATENT DOCUMENTS

JP H10-261471 A 9/1998
JP 2004-014220 A 1/2004

OTHER PUBLICATIONS

International Search Report dated Jun. 23, 2020 for WO 2020/209177 A1 (5 pages).

*Primary Examiner* — Briggitte R. Hammond
(74) *Attorney, Agent, or Firm* — Venjuris, P.C.

(57) ABSTRACT

A joint connector includes the plurality of wires extending in an extending direction, a plurality of terminals to be respectively connected to front end parts of the plurality of wires in the extending direction, a lower housing for accommodating the plurality of terminals, a busbar to be disposed in the lower housing, and an upper cover to be assembled with the lower housing. The busbar includes a plurality of tabs. Each of the plurality of terminals includes a tube portion,
(Continued)

into which each of the plurality of tabs is inserted, and a wire connecting portion to be connected to each of the plurality of wires. The plurality of wires drawn out rearward in the extending direction from the lower housing include bent portions folded forward in the extending direction. The upper cover includes wire pressing portions for holding the plurality of wires folded forward in the extending direction.

6 Claims, 15 Drawing Sheets

(51) Int. Cl.
*H01R 4/18* (2006.01)
*H01R 25/16* (2006.01)

(56) References Cited

U.S. PATENT DOCUMENTS

| | | | | |
|---|---|---|---|---|
| 5,741,147 | A | 4/1998 | Konoya et al. | |
| 6,162,084 | A | 12/2000 | Chen et al. | |
| 6,729,895 | B1 | 5/2004 | Bryan | |
| 9,172,193 | B2 * | 10/2015 | Sakamoto | H01R 24/28 |
| 9,608,354 | B2 * | 3/2017 | Lee | H01R 13/4361 |
| 10,483,675 | B2 * | 11/2019 | Nishiyama | H01R 31/08 |
| 10,651,604 | B2 * | 5/2020 | Tsukamoto | H01R 31/08 |
| 11,749,933 | B2 * | 9/2023 | Kobayashi | H01R 13/506<br>439/723 |
| 2002/0119710 | A1 | 8/2002 | Mello et al. | |
| 2003/0104732 | A1 | 6/2003 | Ferderer | |
| 2011/0104929 | A1 | 5/2011 | Suzuki et al. | |
| 2014/0287621 | A1 * | 9/2014 | Smutny | H01R 31/08<br>439/658 |

* cited by examiner

JOINT CONNECTOR

CROSS REFERENCE TO RELATED APPLICATIONS

This application is a national phase of PCT application No. PCT/JP2020/015214, filed on 2 Apr. 2020, which claims priority from Japanese patent application No. 2019-074919, filed on 10 Apr. 2019, all of which are incorporated herein by reference.

TECHNICAL FIELD

The present disclosure relates to a joint connector.

BACKGROUND

A joint connector is known from Japanese Patent Laid-Open Publication No. H10-261471. In this joint connector, a retainer body of a busbar-equipped retainer is fittably provided at terminal insertion openings of respective terminal accommodation chambers of a housing, the retainer body is provided with locking portions to be locked to engaging portions provided at the terminal insertion openings of the respective terminal accommodation chambers, and terminals of a busbar of the busbar-equipped retainer are lockable to locking portions of a joint terminal. Further, a retainer body of a retainer having the same shape as the busbar-equipped retainer is fittably provided at the terminal insertion openings of the respective terminal accommodation chambers of each housing.

PRIOR ART DOCUMENT

Patent Document

Patent Document 1: JP H10-261471 A

SUMMARY OF THE INVENTION

Problems to be Solved

Recently, miniaturization has been required for joint connectors to be equipped in vehicles. As a housing of a joint connector is reduced in size, the miniaturization of a component (e.g. retainer) for locking terminals is also considered. Then, the strength of the component for locking the terminals may be reduced. In this way, the terminals are not firmly locked in the housing, with the result that there is a concern that the terminals and the housing rattle due to an external force transmitted to the terminals via wires. Further, if the terminals are reduced in size, the strength of the terminals themselves is also reduced. Thus, troubles of the terminals themselves may be caused by the external force applied via the wires.

The present disclosure was completed on the basis of the above situation and aims to provide a joint connector capable of suppressing the transmission of an external force from wires to terminals.

Means to Solve the Problem

The present disclosure is directed to a joint connector for connecting a plurality of wires, the joint connector including the plurality of wires extending in an extending direction, a plurality of terminals to be respectively connected to front end parts in the extending direction of the plurality of wires, a lower housing for accommodating the plurality of terminals, a busbar to be disposed in the lower housing, and an upper cover to be assembled with the lower housing, wherein the busbar includes a plurality of tabs, each of the plurality of terminals includes a busbar connecting portion to be connected to each of the plurality of tabs and a wire connecting portion to be connected to each of the plurality of wires, the plurality of wires drawn out rearward in the extending direction from the lower housing include bent portions folded forward in the extending direction, and the upper cover includes wire pressing portions for holding the plurality of wires folded forward in the extending direction.

Effect of the Invention

According to the present disclosure, it is possible to suppress the transmission of an external force from wires to terminals.

DETAILED DESCRIPTION TO EXECUTE THE INVENTION

Description of Embodiments of Present Disclosure

Figure 1:
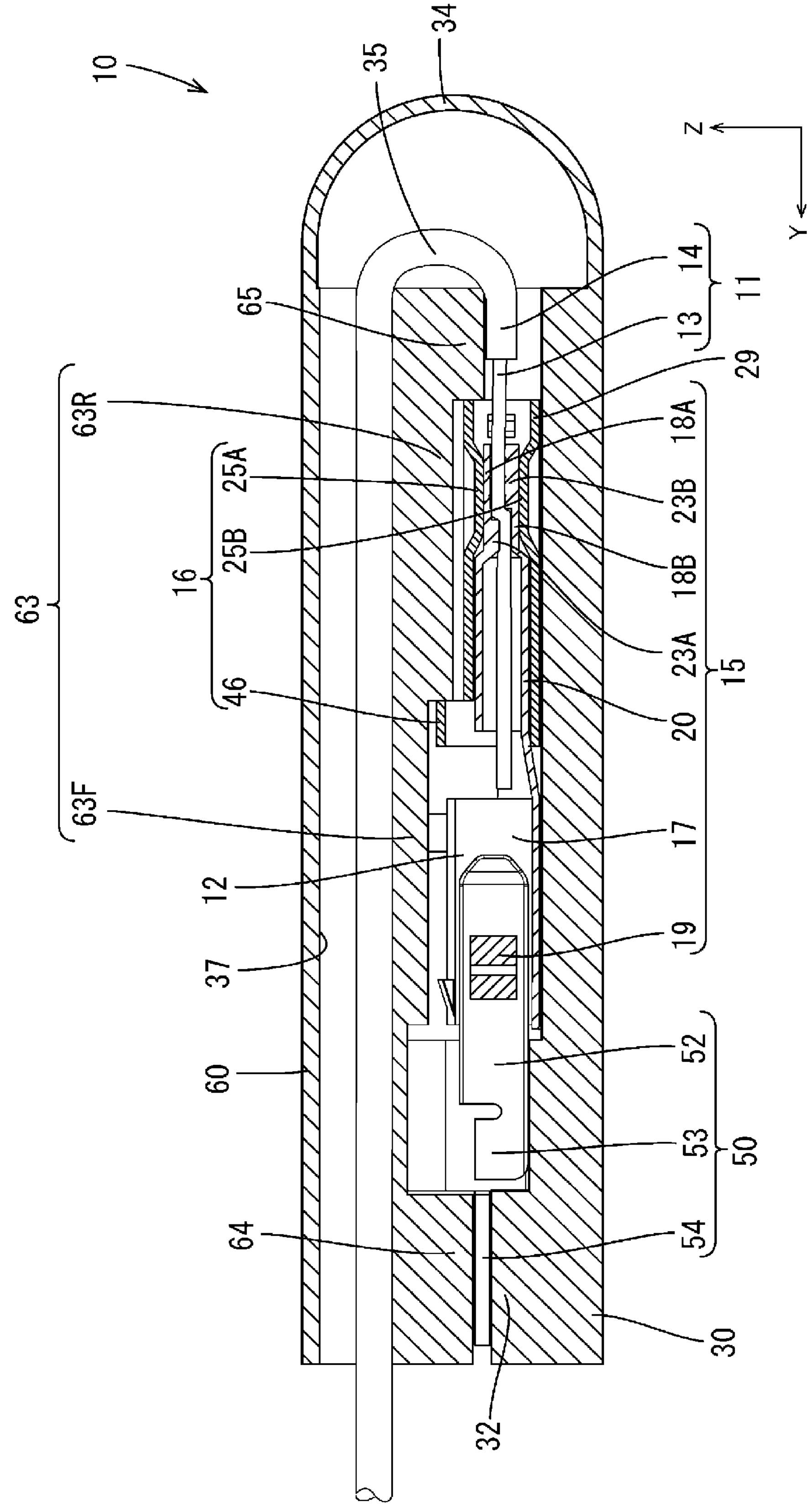
FIG. 1 is a section along I-I in FIG. 9 showing a joint connector according to a first embodiment.

First, embodiments of the present disclosure are listed and described.

(1) The joint connector of the present disclosure is for connecting a plurality of wires and includes the plurality of wires extending in an extending direction, a plurality of terminals to be respectively connected to front end parts in the extending direction of the plurality of wires, a lower housing for accommodating the plurality of terminals, a busbar to be disposed in the lower housing, and an upper cover to be assembled with the lower housing, wherein the busbar includes a plurality of tabs, each of the plurality of terminals includes a busbar connecting portion to be connected to each of the plurality of tabs and a wire connecting portion to be connected to each of the plurality of wires, the plurality of wires drawn out rearward in the extending direction from the lower housing include bent portions folded forward in the extending direction, and the upper cover includes wire pressing portions for holding the plurality of wires folded forward in the extending direction.

If an external force is applied to the plurality of wires extending forward in the extending direction, this external force is transmitted rearward in the respective wires in the extending direction. The extending direction of the respective wires is inverted at the bent portions. In this way, the force transmitted to the respective wires is absorbed at the bent portions, wherefore the transmission of the force applied to the wires to the terminals is suppressed.

(2) Preferably, the upper cover includes a wire pressing portion for pressing the plurality of wires drawn out rearward in the extending direction from the lower housing toward the lower housing.

Since the plurality of wires are pressed toward the lower housing by the wire pressing portion of the upper cover, the transmission of a force applied to the wires beyond the wire pressing portion is suppressed. In this way, the transmission of an external force applied to the wires to the terminals is suppressed.

(3) Preferably, the upper cover is coupled to the lower housing via a hinge extending rearward from the lower housing in the extending direction.

Since the lower housing and the upper cover are coupled via the hinge, the number of components can be reduced. Further, since the plurality of wires are protected by the hinge, the application of an external force to the wires is suppressed.

(4) Preferably, the upper cover includes terminal engaging portions to be engaged with the terminals from behind in the extending direction with the upper cover assembled with the lower housing.

Since the terminal engaging portion is engaged with the terminal from behind in the extending direction, even if an external force applied to the wire reaches the wire connecting portion beyond the bent portion, a rearward movement of the terminal in the extending direction is suppressed. In this way, the terminal is firmly held in the lower housing and the upper cover.

(5) Preferably, a busbar holding portion for sandwiching the busbar between the lower housing and the busbar holding portion with the lower housing and the upper cover assembled is provided on an inner surface of the upper cover.

The busbar can be held by a simple operation of assembling the lower housing and the upper cover.

(6) Preferably, the wire holding portions are in the form of holes for allowing the wires to be inserted therethrough.

By inserting the wires into the hole-like wire holding portions, the wires can be reliably held along the extending direction. Further, at least parts of the wires disposed in the wire holding portions can be protected from an external force.

(7) Preferably, the wire connecting portion includes a sandwiching portion extending along the extending direction, the sandwiching portion sandwiching one of the plurality of wires, and a slide portion disposed outside the sandwiching portion, the slide portion being movable along the extending direction, and the slide portion includes a pressurizing portion for pressurizing the sandwiching portion toward the wire with one of the plurality of wires sandwiched by the sandwiching portion.

Since the wire and the terminal are connected by the sandwiching portion being pressed by the pressurizing portion, dies necessary in crimping a barrel to the outer periphery of the wire becomes unnecessary and the manufacturing cost of the joint connector can be reduced.

Details of Embodiment of Present Disclosure

Hereinafter, embodiments of the present disclosure are described. The present invention is not limited to these illustrations and is intended to be represented by claims and include all changes in the scope of claims and in the meaning and scope of equivalents.

First Embodiment

A first embodiment of the present disclosure is described with reference to FIGS. 1 to 9. A joint connector 10 according to this embodiment electrically connects a plurality of wires 11. In the following description, a direction indicated by an arrow Z is an upward direction, a direction indicated by an arrow Y is a forward direction and a direction indicated by an arrow X is a leftward direction. Note that, for a plurality of identical members, only some may be denoted by a reference sign and the others may not be denoted by the reference sign.

As shown in FIG. 1, the joint connector 10 according to this embodiment includes a plurality of wires 11 extending in a front-rear direction (an example of an extending direction), a plurality of terminals 12 to be respectively connected to front end parts of the plurality of wires 11, a busbar 50 to be connected to the plurality of terminals 12, a lower housing 30 for accommodating the plurality of terminals 12 and the busbar 50 inside, and an upper cover 60 to be mounted on an upper-rear part of the lower housing 30.

[Wires 11]

As shown in FIG. 1, the plurality of wires 11 are disposed to extend in the front-rear direction (an example of the extending direction). In the wire 11, the outer periphery of a core 13 is surrounded with an insulation coating 14 made of insulating synthetic resin. The core 13 according to this embodiment is composed of one metal wire. Note that the core 13 may be a stranded wire formed by twisting a plurality of metal thin wires. An arbitrary metal such as copper, copper alloy, aluminum or aluminum alloy can be appropriately selected as a metal constituting the core 13 if necessary. The core 13 according to this embodiment is made of copper or copper alloy.

[Lower Housing 30]

Figure 2:
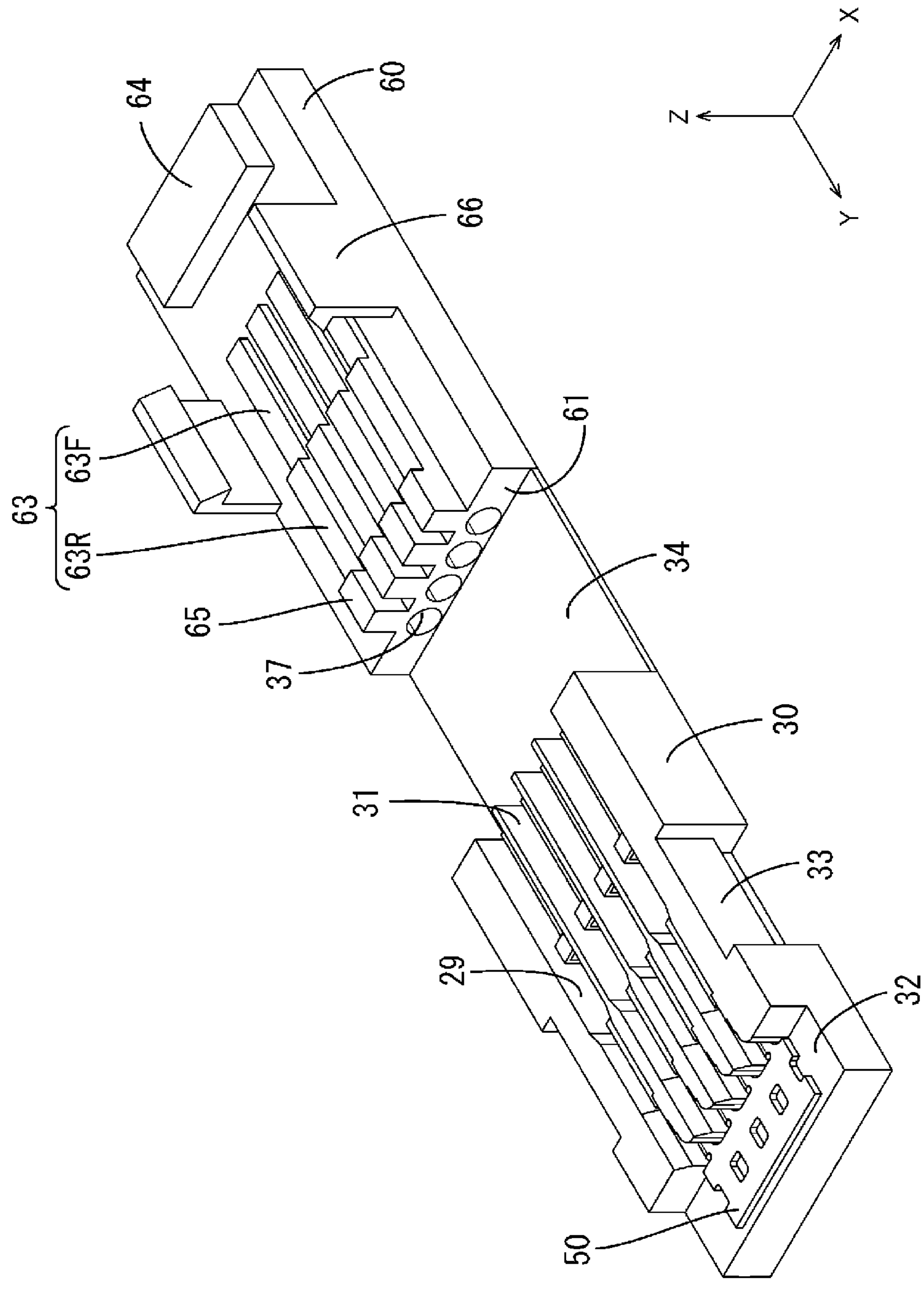
FIG. 2 is a perspective view showing a lower housing, a hinge and an upper cover.

As shown in FIG. 2, the lower housing 30 has a rectangular parallelepiped shape flat in a vertical direction and is formed by injection-molding a material containing an insulating synthetic resin. The lower housing 30 is formed with a plurality of (four in this embodiment) cavities 29 extending in the front-rear direction and arranged in a lateral direction. The cavities 29 are open upward and the terminals 12 are arranged into the cavities 29 from above. The cavities 29 adjacent in the lateral direction are partitioned by partition walls 31 extending in the front-rear direction. The terminals 12 arranged in the respective cavities 29 are electrically insulated by these partition walls 31.

As shown in FIG. 2, the cavities 29 are open forward in a front end part of the lower housing 30. A busbar placing portion 32 flush with the bottom walls of the cavities 29 and formed to extend in the lateral direction is formed in the front end part of the lower housing 30. The busbar 50 is placed on the busbar placing portion 32 from above.

[Upper Cover 60]

As shown in FIG. 1, the lower housing 30 has an upper part covered by the upper cover 60 assembled from above.

The upper cover 60 is formed by injection-molding a material containing an insulating synthetic resin. As shown in FIG. 2, lock claws 66 extending in the vertical direction are formed on side edges of the upper cover 60. These lock claws 66 are resiliently engaged with lock receiving portions 33 provided on side walls of the lower housing 30, whereby the lower housing 30 and the upper cover 60 are integrally assembled.

As shown in FIG. 2, a rear end part of the lower housing 30 and a front end part of the upper cover 60 are coupled by a flexible hinge 34. The hinge 34 is in the form of a thin plate and bendably formed.

Figure 3:
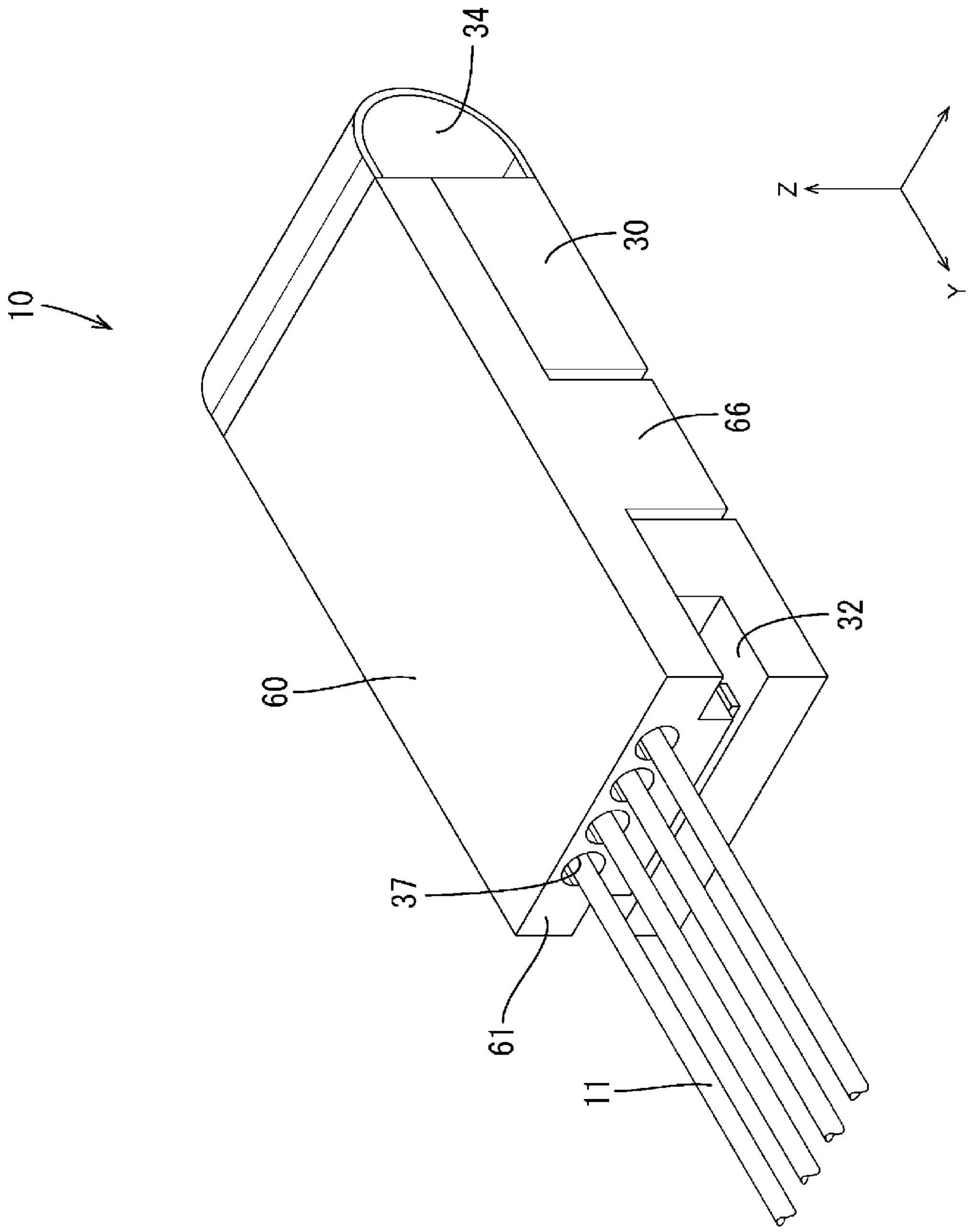
FIG. 3 is a perspective view showing the joint connector.

As shown in FIG. 3, the upper cover 60 includes an upper wall 61. As shown in FIG. 3, the upper wall 61 of the upper cover 60 is provided with a plurality of (four in this embodiment) wire holding portions 37 arranged in the lateral direction and configured to hold the wires 11. The wire holding portions 37 are formed into holes penetrating through the upper wall of the upper cover 60 in the front-rear direction. An inner diameter of the wire holding portions 37 is set to be equal to or larger than an outer diameter of the insulation coatings 14 of the wires 11. In this way, the wires 11 are inserted into the wire holding portions 37.

As shown in FIG. 1, with the lower housing 30 and the upper cover 60 assembled, a front end part of the upper wall 61 of the upper cover 60 is formed with a busbar holding portion 64 projecting downward at a position corresponding to the cavities 29 of the lower housing 30. The busbar 50 is sandwiched between the busbar holding portion 64 and the busbar placing portion 32 of the lower housing 30. In particular, a coupling portion 54 to be described later is sandwiched between the busbar holding portion 64 and the busbar placing portion 32. In this way, the busbar 50 is held in the lower housing 30 and the upper cover 60.

As shown in FIG. 1, with the lower housing 30 and the upper cover 60 assembled, the upper wall 61 is provided with a plurality of (four in this embodiment) terminal engaging portions 63 projecting downward and extending in the front-rear direction at positions behind the busbar holding portion 64. The terminal engaging portion 63 includes a front terminal engaging portion 63F located on a front side and a rear terminal engaging portion 63R located behind the front terminal engaging portion 63F. The rear terminal engaging portion 63R projects more downward than the front terminal engaging portion 63F.

As shown in FIG. 1, with the lower housing 30 and the upper cover 60 assembled, the upper wall 61 is provided with wire pressing portions 65 projecting downward behind the terminal engaging portions 63. The wire pressing portions 65 contact the wires 11 drawn out rearward from rear end parts of the terminals 12 from above and press the wires 11 toward the lower housing 30 from above. As shown in FIG. 2, the wire pressing portions 65 are formed to extend in the lateral direction to reliably press the wires 11 even if the wires 11 drawn out rearward from the terminals 12 are disposed at positions deviated from the cavities 29.

[Busbar 50]

Figure 4:
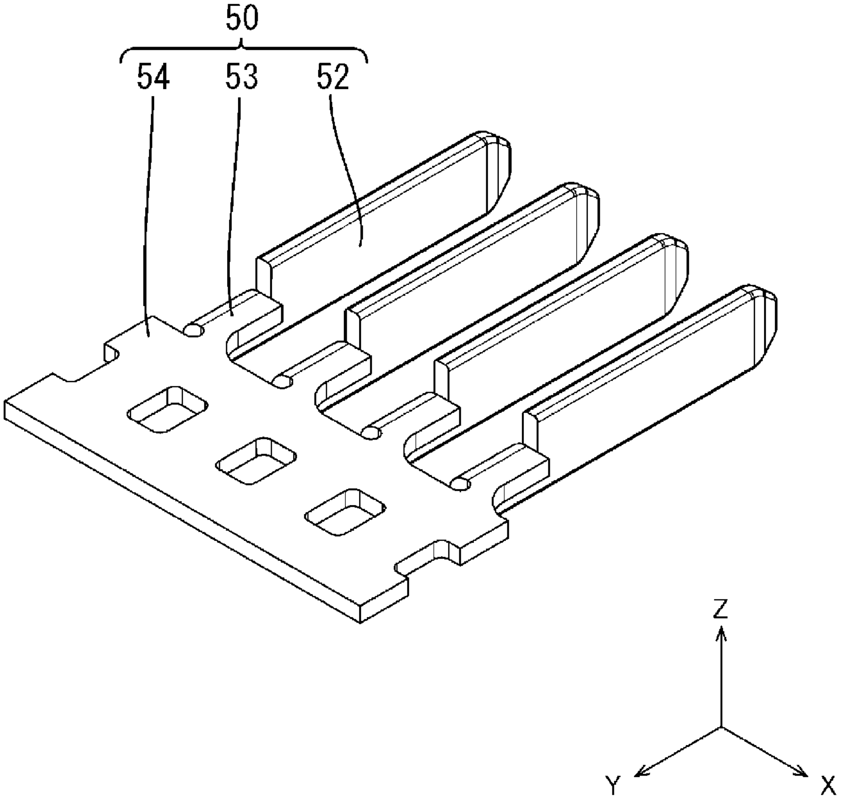
FIG. 4 is a perspective view showing a busbar.

As shown in FIG. 4, the busbar 50 is formed by press-working a metal plate material into a predetermined shape. An arbitrary metal such as copper or copper alloy can be appropriately selected as the metal plate material. The busbar 50 includes a plurality of (four in this embodiment) tabs 52 extending rearward and the coupling portion 54 coupling front end parts of the tabs 52 via relay portions 53. The tab 52 is in the form of a plate flat in the lateral direction. The coupling portion 54 is in the form of a plate flat in the vertical direction. The relay portions 53 are formed to extend rearward from the coupling portion 54. The right side edge of the relay portion 53 is bent downward and connected to the tab 52.

[Terminals 12]

As shown in FIG. 1, the terminal 12 includes a terminal body 15 made of metal and a slide portion 16 relatively slidable with respect to the terminal body 15.

[Terminal Bodies 15]

The terminal body 15 is formed into a predetermined shape by a known method such as press-working, cutting or casting. An arbitrary metal such as copper, copper alloy, aluminum, aluminum alloy or stainless steel can be appropriately selected as a metal constituting the terminal body 15 if necessary. The terminal body 15 according to this embodiment is made of copper or copper alloy. A plating layer may be formed on the surface of the terminal body 15. An arbitrary metal such as tin, nickel or silver can be appropriately selected as a metal constituting the plating layer if necessary. Tin plating is applied to the terminal body 15 according to this embodiment.

As shown in FIG. 1, the terminal body 15 includes a tube portion 17 (an example of a busbar connecting portion) into which the tab 52 is insertable, and a wire connecting portion 20 located behind the tube portion 17 and to be connected to the wire 11. The wire connecting portion 20 includes an upper sandwiching portion 18A and a lower sandwiching portion 18B extending rearward.

As shown in FIG. 1, the tube portion 17 is in the form of a rectangular tube extending in the front-rear direction. The front end of the tube portion 17 is open, so that tab 52 is insertable.

FIG. 1 shows a part of a resilient contact piece 19 provided in the tube portion 17. Although not shown in detail, the resiliently deformable resilient contact piece 19 is disposed inside the tube portion 17. The resilient contact piece 19 extends inward from the inner wall of the tube portion 17. The tab 52 inserted into the tube portion 17 presses and resiliently deforms the resilient contact piece 19. By a resilient force of the resiliently deformed resilient contact piece 19, the tab 52 is sandwiched between the inner wall of the tube portion 17 and the resilient contact piece 19. In this way, the tab 52 and the terminal 12 are electrically connected.

As shown in FIG. 1, the wire connecting portion 20 in the form of a rectangular tube is provided behind the tube portion 17. The upper sandwiching portion 18A (an example of a sandwiching portion) is provided to extend rearward in a rear end part of the upper wall of the wire connecting portion 20, and the lower sandwiching portion 18B (an example of the sandwiching portion) is provided to extend rearward in a rear end part of the lower wall of the wire connecting portion 20. The upper and lower sandwiching portions 18A, 18B have a shape elongated in the front-rear direction. Lengths in the front-rear direction of the upper and lower sandwiching portions 18A, 18B are substantially equal.

An upper holding protrusion 23A projecting downward is provided at a position in front of a rear end part on the lower surface of the upper sandwiching portion 18A. A lower holding protrusion 23B projecting upward is provided on a rear end part on the upper surface of the lower sandwiching portion 18B. The lower and upper holding protrusions 23B, 23A are provided at positions shifted in the front-rear direction.

The lower surface of the upper sandwiching portion 18A and the upper surface of the lower sandwiching portion 18B bite into an oxide film formed on the surface of the core 13 to peel off the oxide film, whereby a metal surface of the core 13 is exposed. By the contact of this metal surface and the upper and lower sandwiching portions 18A, 18B, the core 13 and the terminal body 15 are electrically connected.

[Slide Portion 16]

Figure 5:
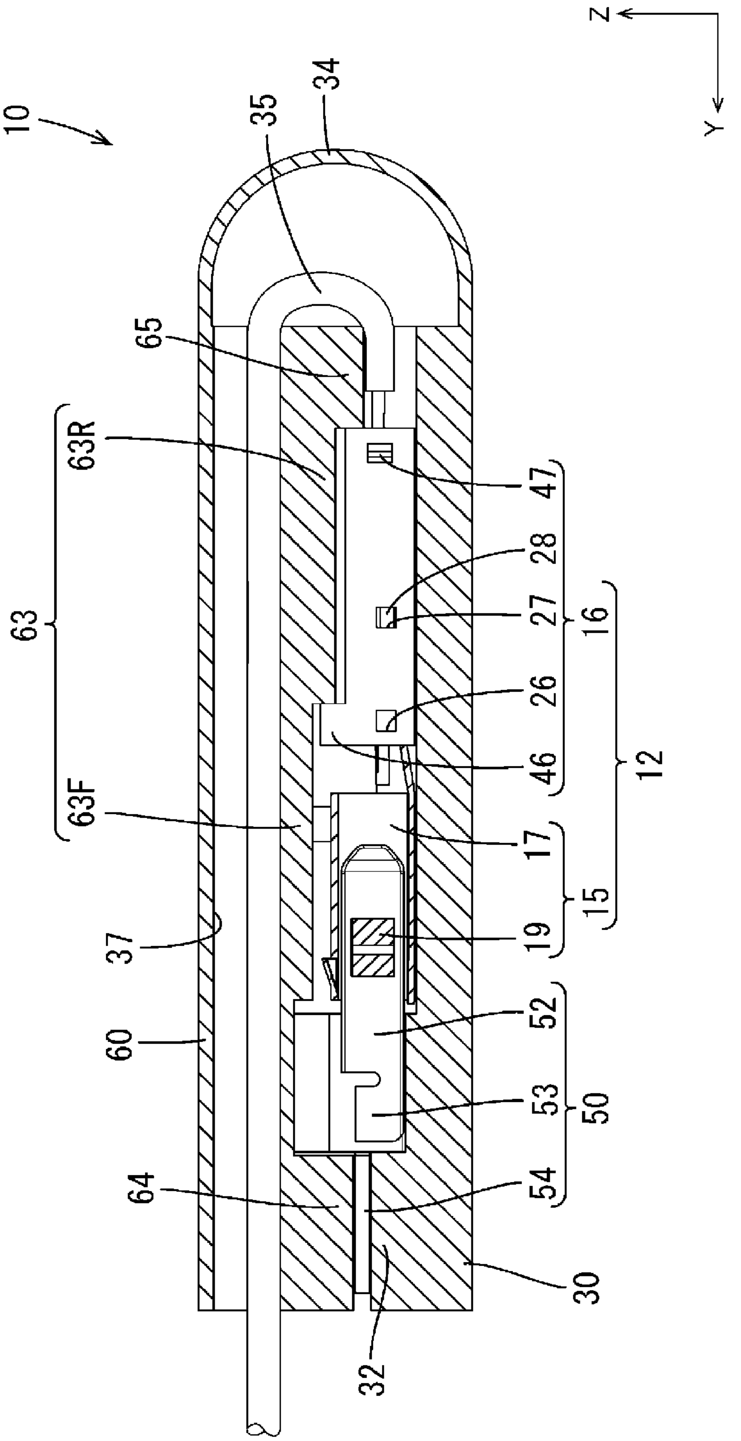
FIG. 5 is a section along V-V in FIG. 9.

As shown in FIGS. 1 and 5, the slide portion 16 is in the form of a rectangular tube extending in the front-rear direction. The slide portion 16 is formed by a known method such as cutting, casting or press-working if necessary. An arbitrary metal such as copper, copper alloy, aluminum, aluminum alloy or stainless steel can be appropriately selected as a metal constituting the slide portion 16 if necessary. Although not particularly limited, the slide portion 16 according to this embodiment is made of stainless steel. A plating layer may be formed on the surface of the slide portion 16. An arbitrary metal such as tin, nickel or silver can be appropriately selected as a metal constituting the plating layer if necessary.

A cross-section of the inner surface shape of the slide portion 16 is the same as or somewhat larger than that of the outer shape of a region of the terminal body 15 where the upper and lower sandwiching portions 18A, 18B are provided. In this way, the slide portion 16 is disposed outside the region of the terminal body 15 where the upper and lower sandwiching portions 18A, 18B are provided.

As shown in FIG. 1, an upper pressurizing portion 25A (an example of a pressurizing portion) projecting downward is provided on the lower surface of the upper wall of the slide portion 16. A lower pressurizing portion 25B (an example of the pressurizing portion) projecting upward is provided on the upper surface of the lower wall of the slide portion 16.

As shown in FIG. 5, a partial lock receiving portion 26 is open at a position near a front end part in a side wall of the slide portion 16. Further, a full lock receiving portion 27 is open at a position behind the partial lock receiving portion 26 in the side wall of the slide portion 16. The partial lock receiving portion 26 and the full lock receiving portion 27 are resiliently lockable to a locking projection 28 provided on a side wall of the terminal body 15.

With the locking projection 28 of the terminal body 15 and the partial lock receiving portion 26 of the slide portion 16 locked, the slide portion 16 is held at a partial locking position with respect to the terminal body 15. In this state, the upper and lower pressurizing portions 25A, 25B of the slide portion 16 are separated rearward from the rear end edges of the upper and lower sandwiching portions 18A, 18B of the terminal body 15. Further, in this state, an interval between the upper and lower sandwiching portions 18A, 18B is set to be larger than a diameter of the core 13.

With the locking projection 28 of the terminal body 15 and the full lock receiving portion 27 of the slide portion 16 locked, the slide portion 16 is held at a full locking position with respect to the terminal body 15. As shown in FIG. 1, in this state, the upper pressurizing portion 25A of the slide portion 16 is in contact with the upper sandwiching portion 18A from above the upper sandwiching portion 18A. Further, the lower pressurizing portion 25B of the slide portion 16 is in contact with the lower sandwiching portion 18B from below the lower sandwiching portion 18B.

As described above, the slide portion 16 is slidable between the partial locking position and the full locking position described above while being externally fit to the region of the terminal body 15 where the upper and lower sandwiching portions 18A, 18B are provided.

As shown in FIG. 1, with the slide portion 16 held at the full locking position with respect to the terminal body 15, the upper pressurizing portion 25A presses the upper sandwiching portion 18A from above, thereby deforming the upper sandwiching portion 18A downward. Further, the lower pressurizing portion 25B presses the lower sandwiching portion 18B from below, thereby deforming the lower sandwiching portion 18B upward. In this way, with the core 13 extending in the front-rear direction (extending direction) in a space between the upper and lower sandwiching portions 18A, 18B and the slide portion 16 held at the full locking position with respect to the terminal body 15, the core 13 is vertically sandwiched by the resiliently deformed upper and lower sandwiching portions 18A, 18B. That is, the upper sandwiching portion 18A contacts the core 13 from above by being pressed downward by the upper pressurizing portion 25A, and the lower sandwiching portion 18B contacts the core 13 from below by being pressed upward by the lower pressurizing portion 25B.

As shown in FIG. 1, with the slide portion 16 held at the full locking position with respect to the terminal body 15, the upper holding protrusion 23A of the upper sandwiching portion 18A presses the core 13 from above and the lower holding protrusion 23B of the lower sandwiching portion 18B presses the core 13 from below. In this way, the core 13 is pressed from above by the upper holding protrusion 23A and pressed from below by the lower holding protrusion 23B disposed at the position shifted in the front-rear direction from the upper holding protrusion 23A, thereby being held in a state bent in the vertical direction (an example of a direction intersecting the extending direction). The core 13 and the terminal 12 are electrically connected also by the upper and lower holding protrusions 23A, 23B.

As shown in FIG. 1, a jig contact portion 46 projecting upward from the upper wall is provided in a front end part of the slide portion 16. By bringing a jig (not shown) into contact with the jig contact portion 46 from behind and pushing the slide portion 16 forward by this jig, the slide portion 16 is movable forward.

As shown in FIGS. 1 and 5, a pair of guiding portions 47 projecting inwardly of the slide portion 16 are provided at positions near a rear end part of the slide portion 16 on both left and right side walls. The guiding portions 47 are formed to become narrower from a rear side toward a front side. The core 13 slides in contact with the inner surfaces of the guiding portions 47, thereby being guided into the slide portion 16.

As shown in FIGS. 1 and 5, with the lower housing 30 and the upper cover 60 assembled, the front terminal engaging portion 63F is engaged with the tube portion 17 from above to suppress an upward movement of the tube portion 17. The rear terminal engaging portion 63R is engaged with the slide portion 16 from above to suppress an upward movement of the slide portion 16. A front end part of the rear terminal engaging portion 63R is engaged with the jig contact portion of the slide portion 16 from behind, thereby suppressing rearward movements of the slide portion 16 and the terminal body 15. A front end part of the wire pressing portion 65 is engaged with a rear end part of the slide portion 16 from behind, thereby suppressing rearward movements of the slide portion 16 and the terminal body 15.

[Assembling Process of Joint Connector 10]

Next, an example of an assembling process of the joint connector 10 according to this embodiment is described. The assembling process of the joint connector 10 is not limited to the one described below.

The terminal body 15 and the slide portion 16 are formed by a known method. The slide portion 16 is assembled with the terminal body 15 from behind. The front end edge of the slide portion 16 comes into contact with the locking projection 28 of the terminal body 15 from behind, and the side wall of the slide portion 16 is expanded and deformed. If the slide portion 16 is further pushed forward, the side wall of the slide portion 16 is restored and the partial lock receiving portion 26 of the slide portion 16 is locked to the locking projection 28 of the terminal body 15. In this way, the slide portion 16 is held at the partial locking position with respect to the terminal body 15. In this way, the terminal 12 is obtained.

The lower housing 30 and the upper cover 60 are integrally formed via the hinge 34 by injection-molding a synthetic resin. As shown in FIG. 2, the lower housing 30 and the upper cover 60 are disposed one behind the other via the hinge 34.

The tabs 52 of the busbar 50 are inserted into the tube portions 17 from front. By the contact of the tabs 52 and the resilient contact pieces 19, the tabs 52 and the terminals 12 are electrically connected. In this way, the plurality of terminals 12 are electrically connected via the busbar 50.

As shown in FIG. 2, the terminals 12 connected to the busbar 50 are inserted into the cavities 29 of the lower housing 30 from above.

Figure 6:
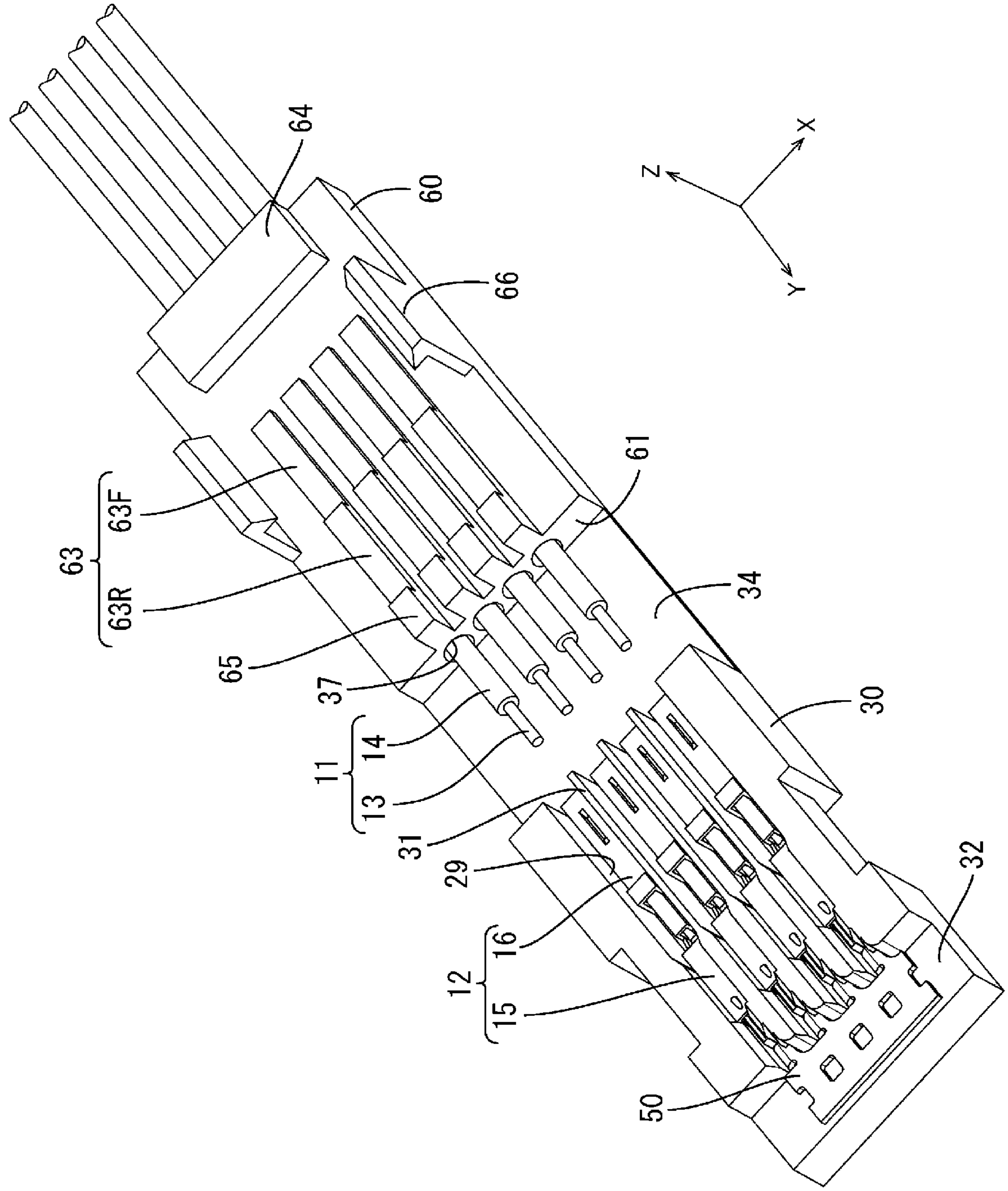
FIG. 6 is a perspective view showing a state where wires are inserted in the upper cover.

The core 13 of the wire 11 is exposed by stripping the insulation coating 14 by a known method. As shown in FIG. 6, the wires 11 are inserted into the wire holding portions 37 of the upper cover 60 from behind with the cores 13 located on a front side. With the lower housing 30 and the upper cover 60 arranged one behind the other via the hinge 34, the cavities 29 are located in front of the respective wire holding portions 37. In this way, the wires 11 inserted into the wire holding portions 37 enter the respective cavities 29.

Figure 7:
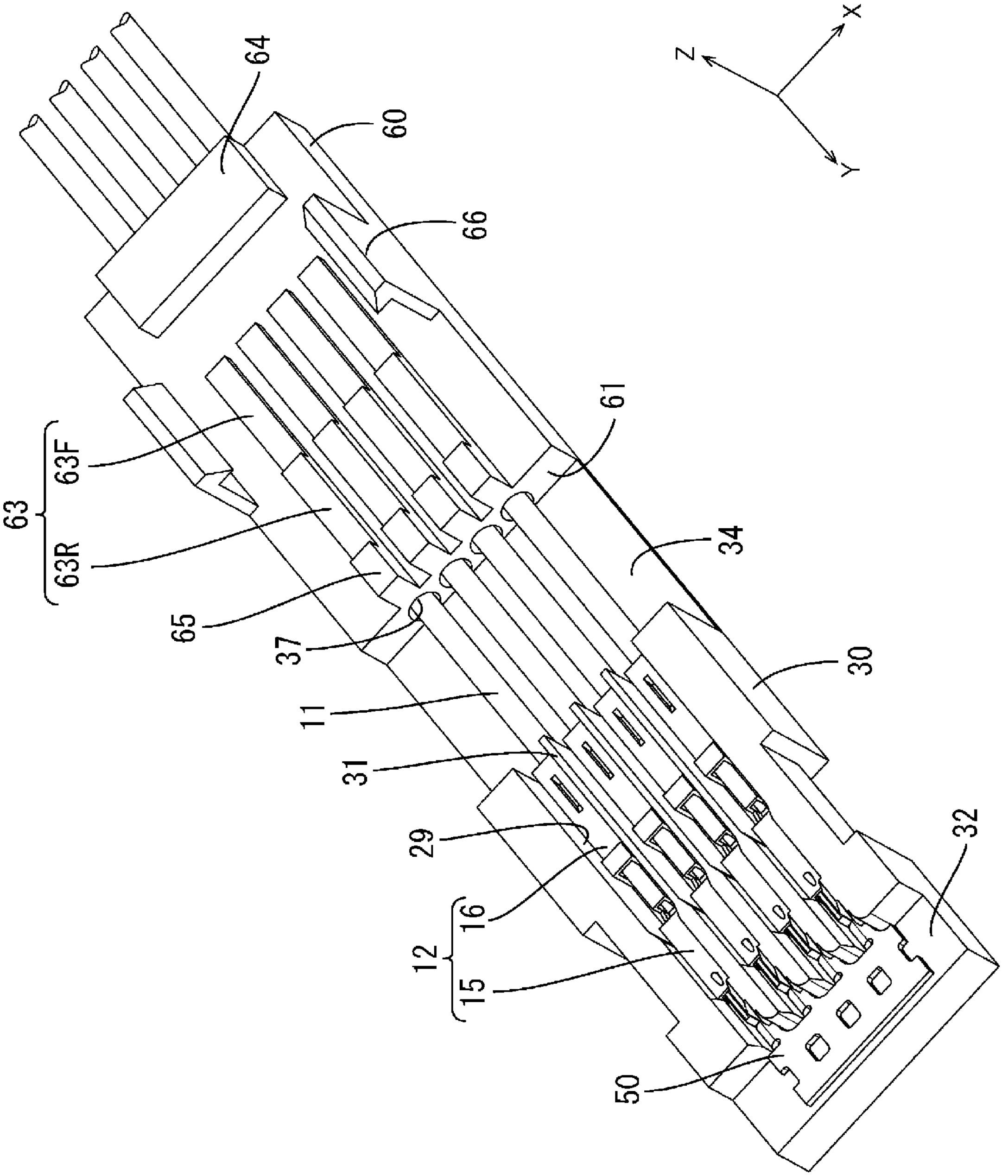
FIG. 7 is a perspective view showing a state where the wires are inserted in terminals.

If the wires 11 are further pushed forward as shown in FIG. 7, front end parts of the cores 13 are introduced into the slide portions 16 through rear end parts of the slide portions 16. The cores 13 are guided into the slide portions 16 by coming into contact with the guiding portions 47 of the slide portions 16. If the wires 11 are further pushed forward, the front end parts of the cores 13 enter the terminal bodies 15 and reach the spaces between the upper and lower sandwiching portions 18A, 18B.

Figure 8:
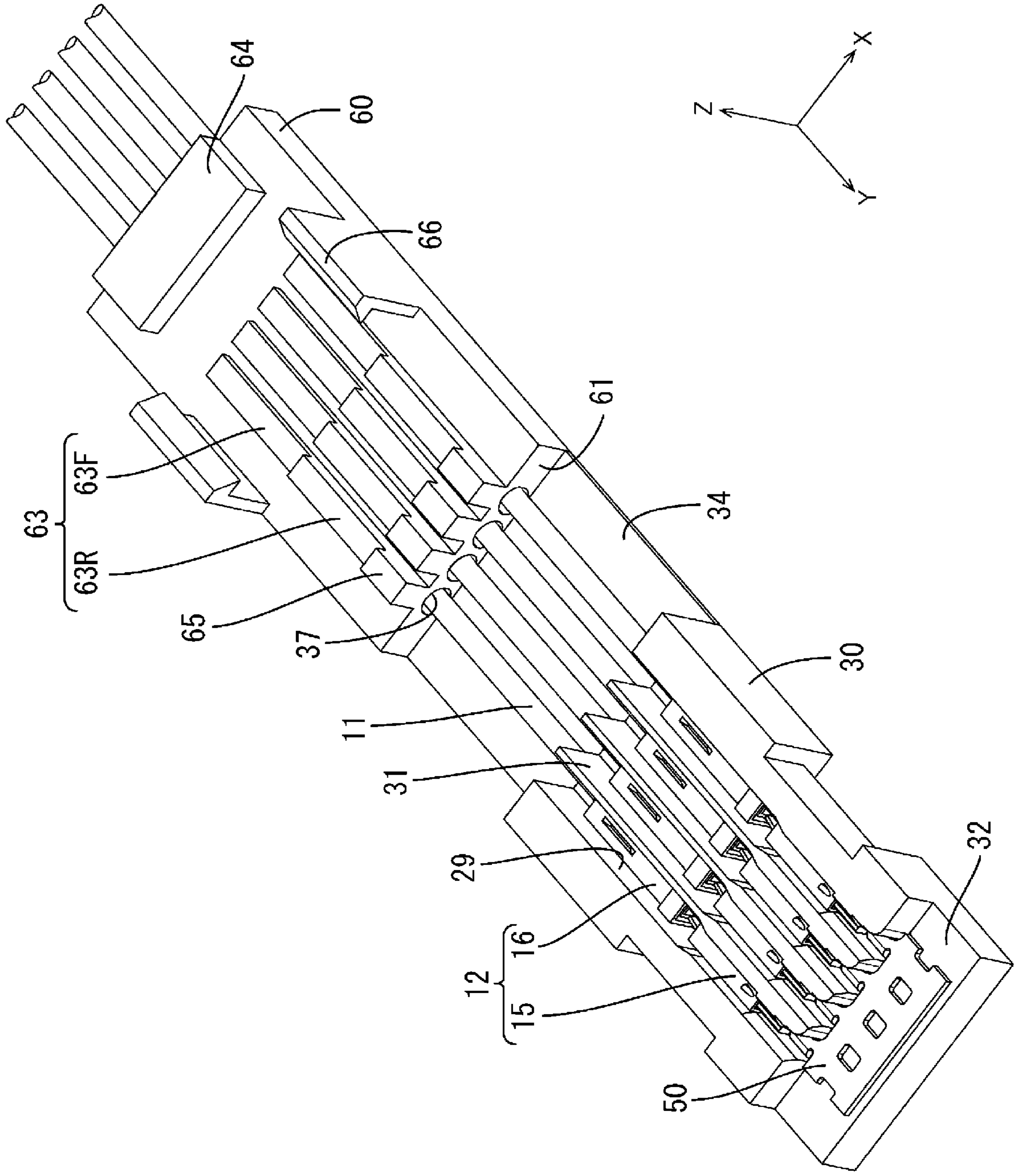
FIG. 8 is a perspective view showing a state where the wires and the terminals are electrically connected by moving slide portions to a full locking position.
Figure 9:
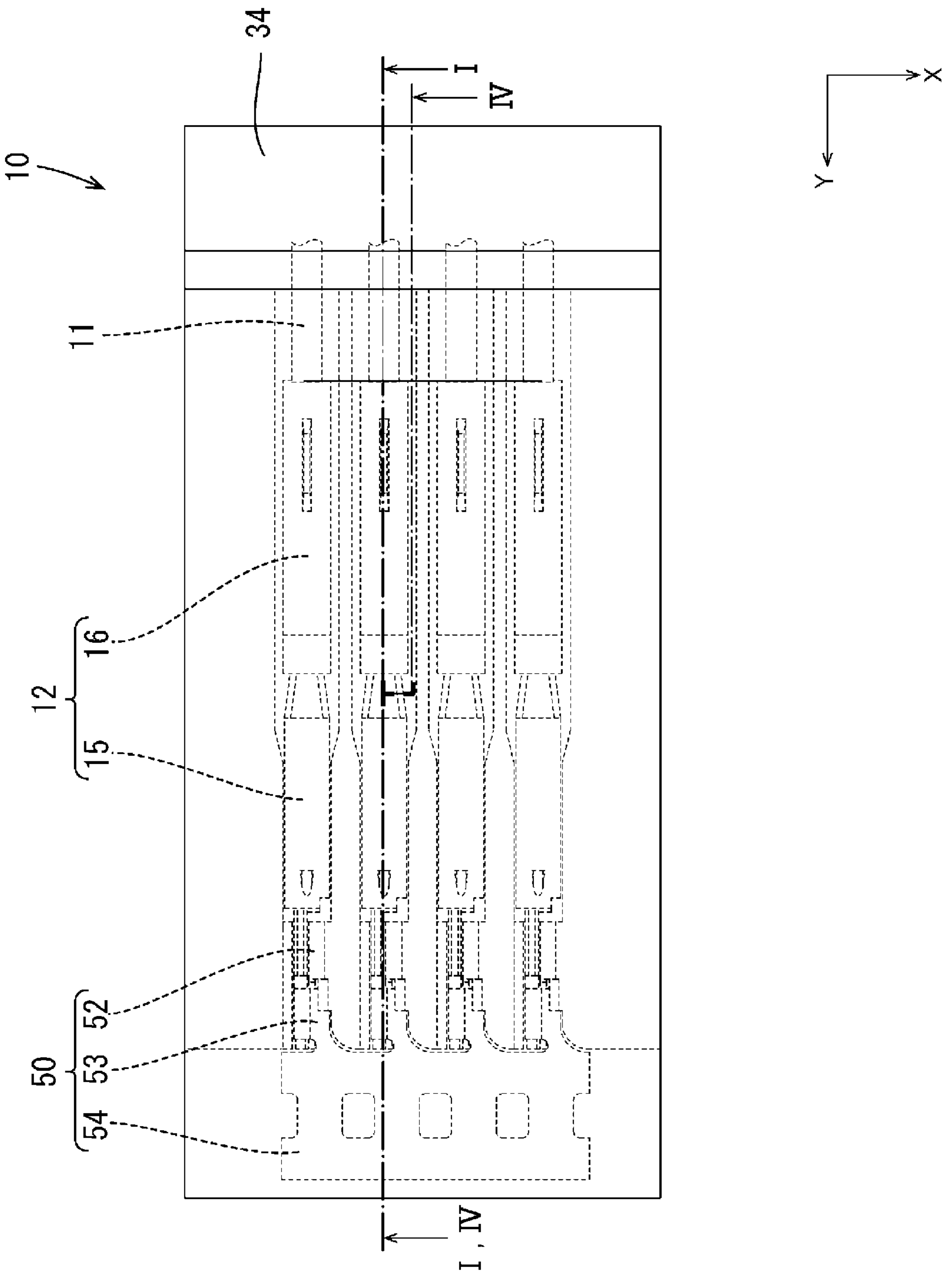
FIG. 9 is a plan view showing the joint connector.

Subsequently, as shown in FIG. 8, the jig (not shown) is brought into contact with the jig contact portion 46 to slide the slide portion 16 forward. The slide portion 16 is moved relatively forward with respect to the terminal body 15. At this time, locking between the locking projection 28 of the terminal body 15 and the partial lock receiving portion 26 of the slide portion 16 is released and the side wall of the slide portion 16 rides on the locking projection 28 to be expanded and deformed.

When the slide portion 16 is moved forward, the side wall of the slide portion 16 is restored and the locking projection 28 of the terminal body 15 and the full lock receiving portion 27 of the slide portion 16 are resiliently locked. In this way, the slide portion 16 is held at the full locking position with respect to the terminal body 15.

With the slide portion 16 held at the full locking position with respect to the terminal body 15, the upper pressurizing portion 25A of the slide portion 16 comes into contact with the upper sandwiching portion 18A of the terminal body 15 from above to press the upper sandwiching portion 18A downward. Further, the lower pressurizing portion 25B of the slide portion 16 comes into contact with the lower sandwiching portion 18B of the terminal body 15 from below to press the lower sandwiching portion 18B upward. In this way, the core 13 is sandwiched from upper and lower sides by the upper and lower sandwiching portions 18A, 18B (see FIG. 1).

As shown in FIG. 1, the core 13 is sandwiched by the lower surface of the upper sandwiching portion 18A and the upper surface of the lower sandwiching portion 18B, whereby the oxide film formed on the surface of the core 13 is peeled off to expose the metal surface constituting the core 13. By the contact of this metal surface with the upper and lower sandwiching portions 18A, 18B, the wire 11 and the terminal 12 are electrically connected. In this way, the plurality of wires 11 are electrically connected via the terminals 12 and the busbar 50 (see FIG. 9).

With the core 13 sandwiched from upper and lower sides by the upper and lower sandwiching portions 18A, 18B, the core 13 is sandwiched by the upper holding protrusion 23A of the upper sandwiching portion 18A and the lower holding protrusion 23B of the lower sandwiching portion 18B, thereby being held in the state extending in the front-rear direction and bent in the vertical direction. Since the core 13 can be firmly held in this way, a holding force of the wire 11 and the terminal 12 can be enhanced when a pulling force is applied to the wire 11.

As shown in FIG. 1, the upper cover 60 is assembled with the lower housing 30 from above the lower housing 30 while the hinge 34 is bent into a C shape in a side view. By the resilient engagement of the lock claws 66 of the upper cover 60 and the lock receiving portions 33 of the lower housing 30, the lower housing 30 and the upper cover 60 are integrally assembled. With the lower housing 30 and the upper cover 60 assembled, the wires 11 drawn out rearwardly of the lower housing 30 extend upward and are bent forward to extend forward. Out of the wires 11, parts bent into the C shape behind the lower housing 30 and the upper cover 60 serve as bent portions 35. The wires 11 are held to extend forward in the wire holding portions 37 of the upper cover 60. In this way, the joint connector 10 is completed.

Functions and Effects of Embodiment

Next, functions and effects of this embodiment are described. The joint connector 10 of this embodiment is for connecting the plurality of wires 11 and includes the plurality of wires 11 extending along the front-rear direction, the plurality of terminals 12 to be respectively connected to the front end parts of the plurality of wires 11, the lower housing 30 for accommodating the plurality of terminals 12, the busbar 50 to be disposed in the lower housing 30 and the upper cover 60 to be assembled with the lower housing 30, the busbar 50 includes the plurality of tabs 52, each of the plurality of terminals 12 includes the tube portion 17, into which each of the plurality of tabs 52 is inserted, and the wire connecting portion 20 to be connected to each of the plurality of wires 11, the plurality of wires 11 drawn out rearward from the lower housing 30 are folded forward and the upper cover 60 includes the wire holding portions 37 for holding the plurality of wires 11 folded forward.

If an external force is applied to the plurality of wires 11 extending forward from the upper cover 60, this external force is transmitted rearward in the respective wires 11. An extending direction of each wire 11 is inverted in the front-rear direction at the bent portion 35. Since the force transmitted to each wire 11 is absorbed by the bent portion 35 in this way, the transmission of the force applied to the wire 11 to the terminal 12 is suppressed.

According to this embodiment, the upper cover 60 includes the wire pressing portions 65 for pressing the plurality of wires 11 drawn out rearward from the lower housing 30 lower housing toward the lower housing 30.

Since the plurality of wires 11 are pressed toward the lower housing 30 by the wire pressing portions 65 of the upper cover 60, the transmission of a force applied to the wires 11 beyond the wire pressing portions 65 is suppressed. In this way, the transmission of an external force applied to the wires 11 to the terminals 12 is suppressed.

According to this embodiment, the upper cover 60 and the lower housing 30 are coupled via the hinge 34 extending rearward from the lower housing 30.

Since the upper cover 60 and the lower housing 30 are coupled via the hinge 34, the number of components can be reduced. Further, since the plurality of wires 11 are protected by the hinge 34 located outside the plurality of wires 11, the application of an external force to the wires 11 themselves is suppressed.

According to this embodiment, the upper cover 60 includes the terminal engaging portions 63 to be engaged with the terminals 12 from behind with the upper cover 60 assembled with the lower housing 30.

Since the terminal engaging portion 63 is engaged with the terminal 12 from behind along the extending direction, even if an external force applied to the wire 11 reaches the wire connecting portion 20 beyond the bent portion 35, a rearward movement of the terminal 12 is suppressed. In this way, the terminal 12 is firmly held in the lower housing 30 and the upper cover 60.

According to this embodiment, the busbar holding portion 64 for sandwiching the busbar 50 between the lower housing 30 and the busbar holding portion 64 with the lower housing 30 and the upper cover 60 assembled is provided on the lower surface of the upper cover 60.

In this way, the busbar 50 can be held by a simple operation of assembling the lower housing 30 and the upper cover 60.

According to this embodiment, the wire holding portion 37 is formed into a hole through which the wire 11 is inserted.

By inserting the wire 11 through the hole-like wire holding portion 37, the wire 11 can be reliably held along the front-rear direction. Further, at least a part of the wire 11 disposed in the wire holding portion 37 can be protected from an external force.

According to this embodiment, the wire connecting portion 20 includes the upper and lower sandwiching portions 18A, 18B extending along the front-rear direction and configured to sandwich one of the plurality of wires 11 and the slide portion 16 disposed outside the upper and lower sandwiching portions 18A, 18B and movable along the front-rear direction, and the slide portion 16 includes the upper and lower pressurizing portions 25A, 25B for pressurizing the wire 11 toward the upper and lower sandwiching portions 18A, 18B with one of the plurality of wires 11 sandwiched by the upper and lower sandwiching portions 18A, 18B.

Since the wire 11 and the terminal 12 are connected by the upper and lower sandwiching portions 18A, 18B being pressed by the upper and lower pressurizing portions 25A, 25B, dies necessary in crimping a barrel to the outer periphery of the wire 11 become unnecessary and the manufacturing cost of the joint connector 10 can be reduced.

Second Embodiment

Figure 10:
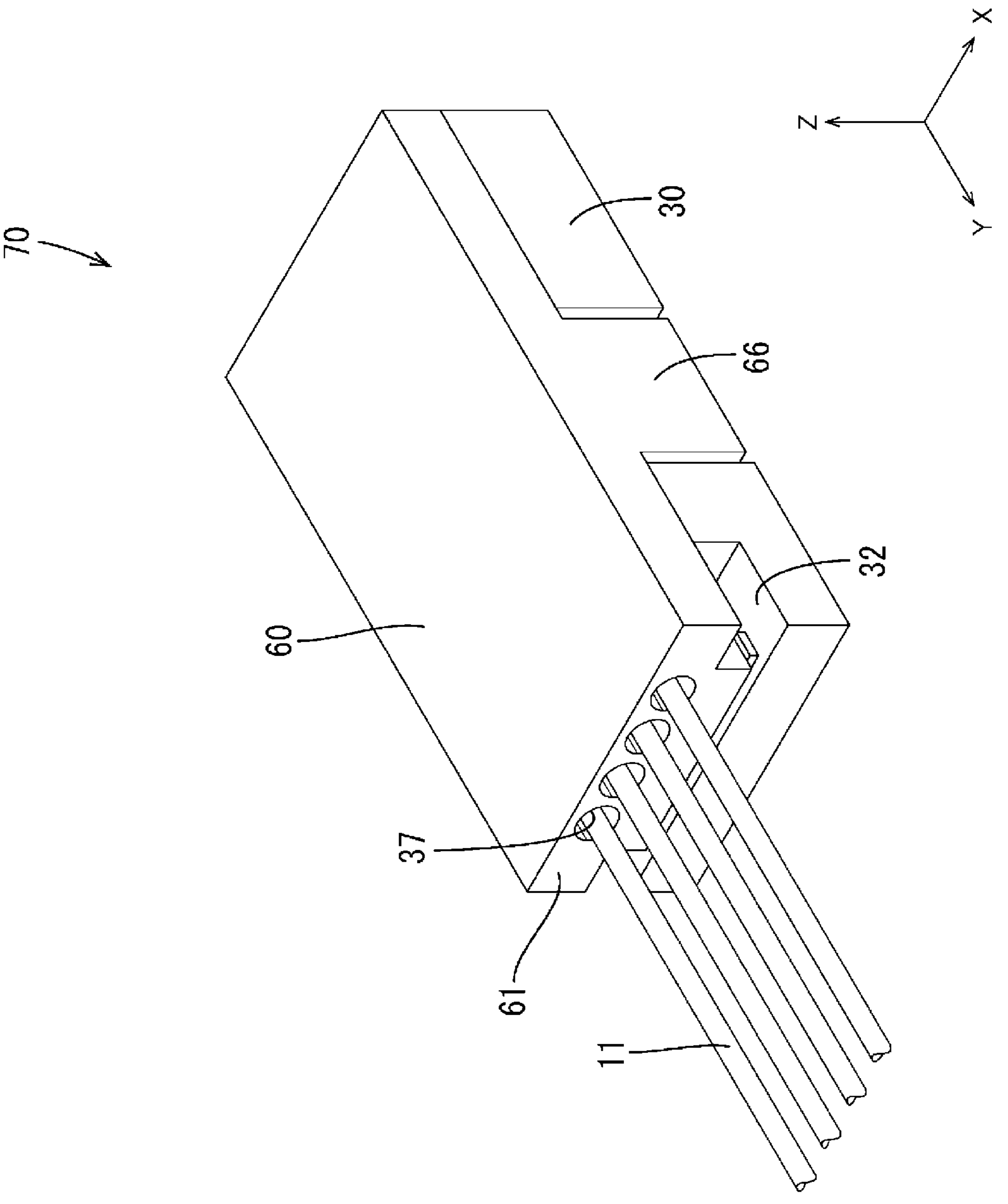
FIG. 10 is a perspective view showing a joint connector according to a second embodiment.

Next, a second embodiment of the present disclosure is described with reference to FIGS. 10 and 11. A joint connector 70 according to this embodiment is not provided with a hinge coupling a lower housing 30 and an upper cover 60, and the lower housing 30 and the upper cover 60 are configured as separate components.

Figure 11:
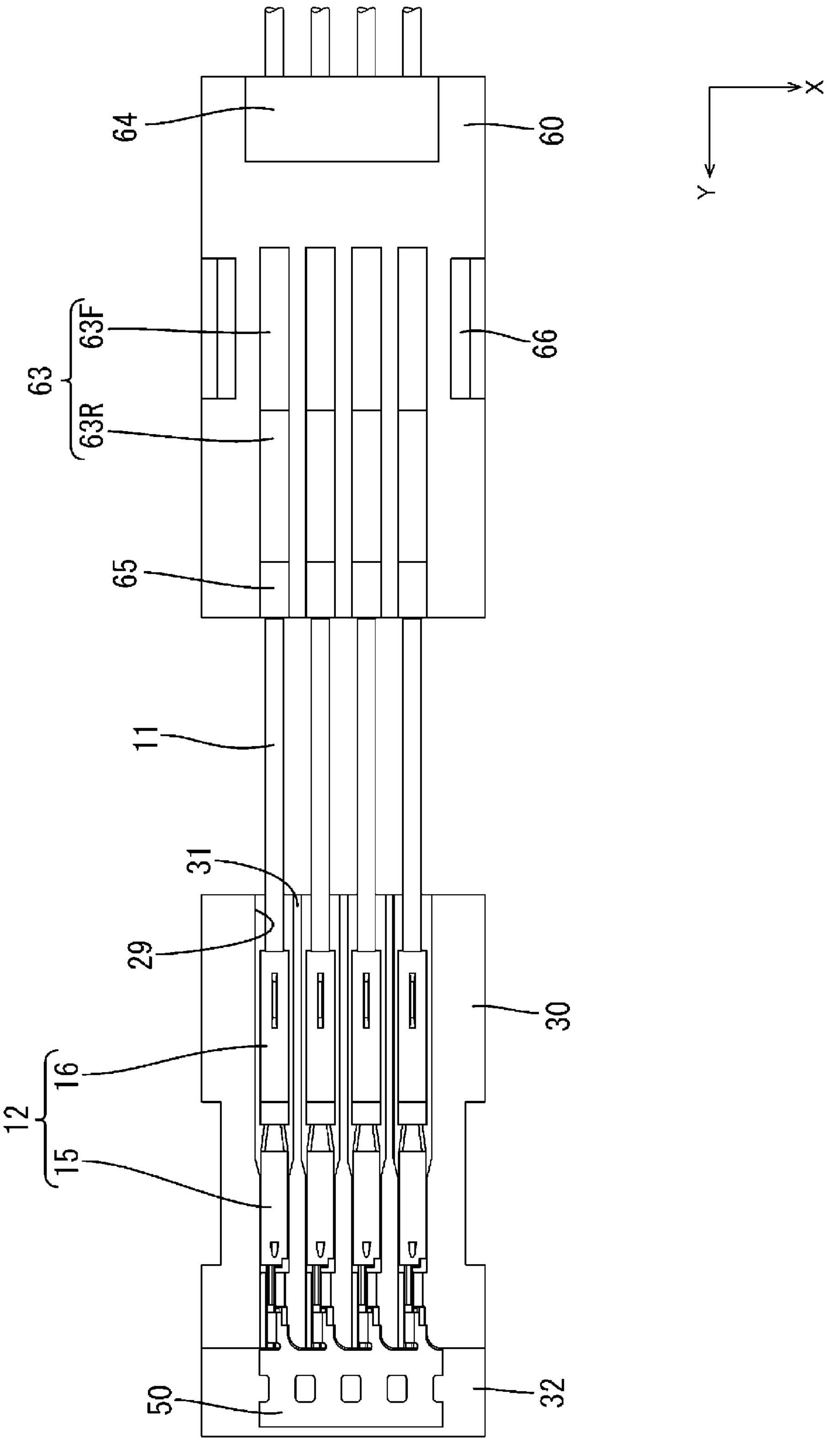
FIG. 11 is a plan view showing a state before a lower housing and an upper cover are assembled.

In this embodiment, wires 11 are inserted into wire holding portions 37 of the upper cover 60 and inserted into terminals 12 accommodated in cavities 29 of the lower housing 30 with the lower housing 30 and the upper cover 60 arranged one behind the other by an unillustrated jig as shown in FIG. 11.

Since the other configuration is substantially the same as in the first embodiment, the same members are denoted by the same reference signs and repeated description is omitted.

Third Embodiment

Next, a third embodiment of the present disclosure is described with reference to FIGS. 12 to 15. A joint connector 80 according to this embodiment includes a lower housing 81, an upper cover 82 to be assembled with the lower housing 81 from above, a busbar 83 to be disposed in the lower housing 81, and terminals 84 to be disposed in the lower housing 81.

[Lower Housing 81]

Figure 12:
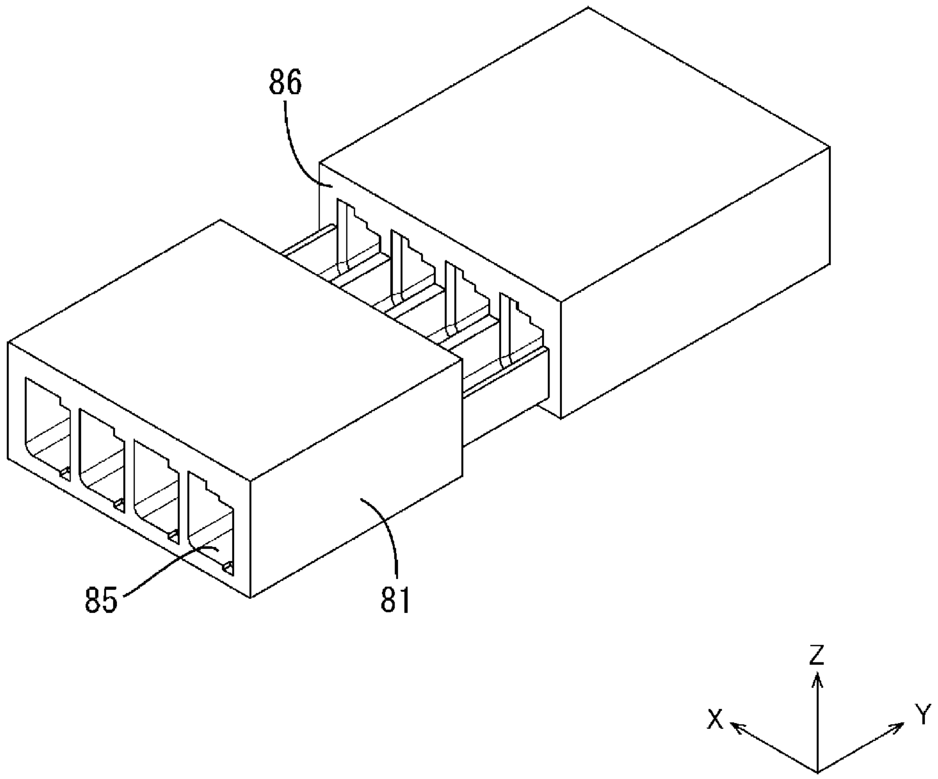
FIG. 12 is a perspective view showing a lower housing according to a third embodiment.

As shown in FIG. 12, the lower housing 81 has a rectangular parallelepiped shape flat in a vertical direction. The lower housing 81 is formed with a plurality of (four in this embodiment) cavities 85 penetrating in a front-rear direction and arranged in a lateral direction. A cut portion 86 cut upward is provided near a center position in the front-rear direction of the lower housing 81. The cavities 85 are exposed upward through the cut portion 86.

Figure 13:
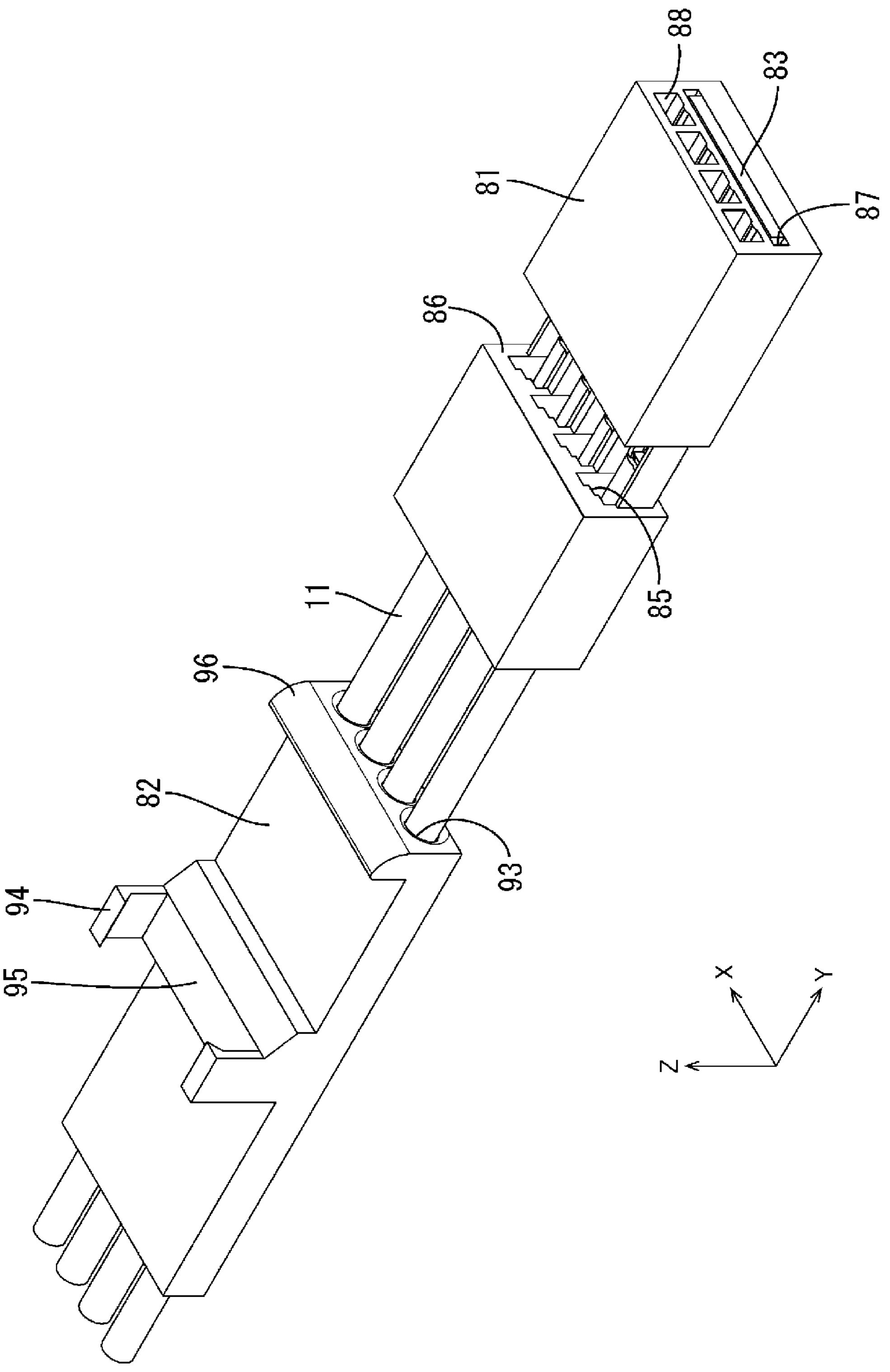
FIG. 13 is a perspective view showing a state before the lower housing and an upper cover are assembled.

As shown in FIG. 13, an elongated busbar insertion hole 87 into which the busbar 83 is inserted from front is formed to extend in the lateral direction in a front end part of the lower housing 81. A height in the vertical direction of the busbar insertion hole 87 is equal to or slightly larger than a thickness of the busbar 83.

A plurality of (four in this embodiment) mold removal holes 88 are formed to extend in the front-rear direction above the busbar insertion hole 87 in the front end part of the lower housing 81. A locking lance 89 for retaining and holding the terminal 84 in the cavity 85 by being resiliently engaged with the terminal 84 is formed inside each mold removal hole 88. The locking lance 89 is shaped to extend forward from the upper wall of the cavity 85. A front end part of the locking lance 89 is engaged with the upper wall of a tube portion 90 of the terminal 84.

[Terminals 84]

The terminal 84 includes the tube portion 90, into which each of a plurality of tabs 91 provided in the busbar 83 is inserted, and a wire connecting portion 92 provided behind the tube portion 90. The wire connecting portion 92 has a so-called barrel shape, and electrically connects the wire 11 and the terminal 84 by being crimped to the outer periphery of the wire 11.

[Upper Cover 82]

The upper cover 82 is formed with a plurality of (four in this embodiment) wire holding portions 93 extending in the front-rear direction. The wire holding portions 93 are formed into holes penetrating through the upper cover 82 in the front-rear direction.

The upper cover 82 is formed with resiliently deformable lock claws 94 projecting in the vertical direction to correspond to the cut portion 86 of the lower housing 81 near a center position in the front-rear direction. The lock claws 94 are disposed on both left and right sides of the cut portion 86 of the lower housing 81 and resiliently engaged with the lower end edges of the cavities 85, whereby the lower housing 81 and the upper cover 82 are integrally assembled.

Figure 14:
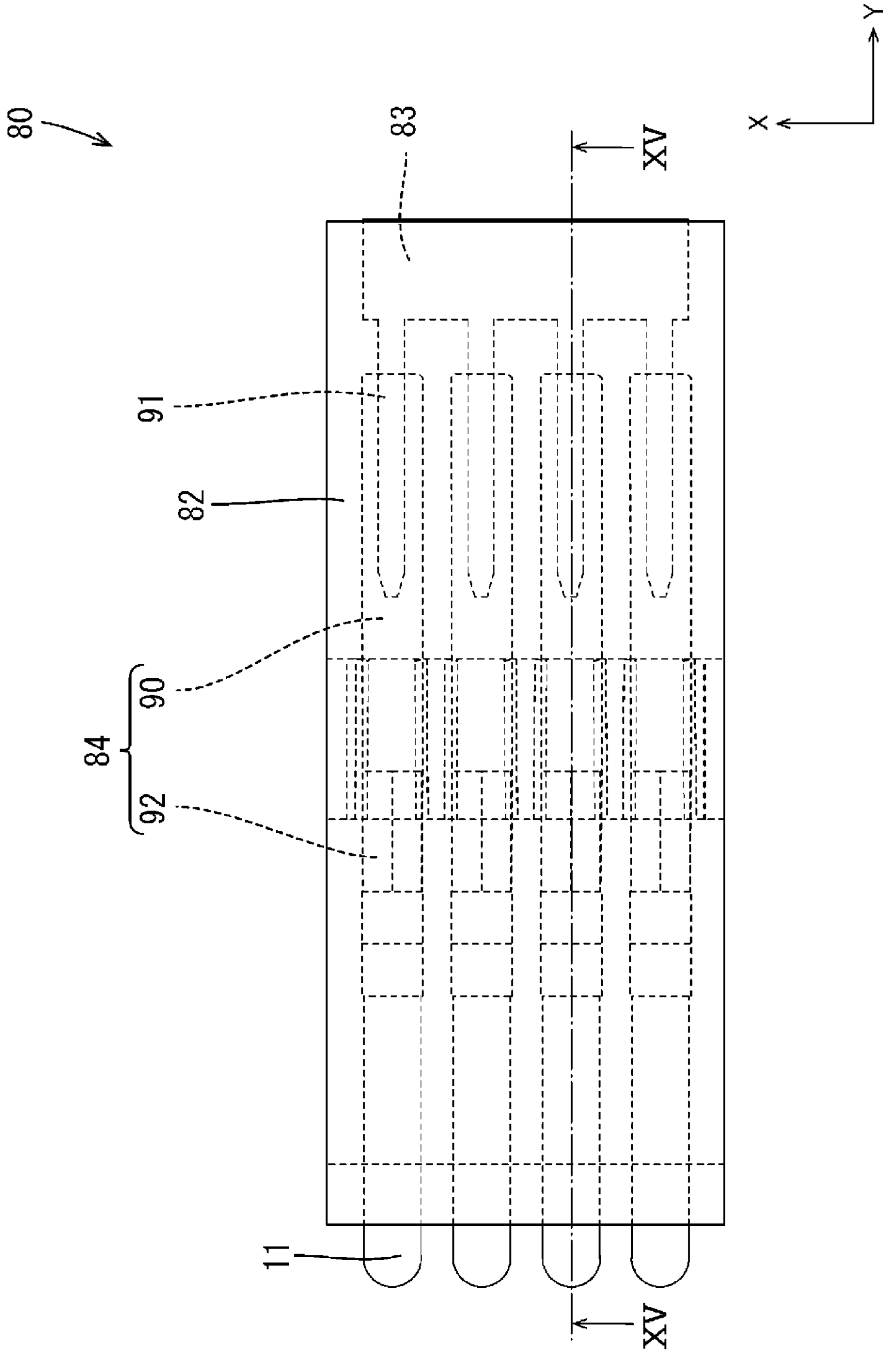
FIG. 14 is a plan view showing a joint connector.
Figure 15:
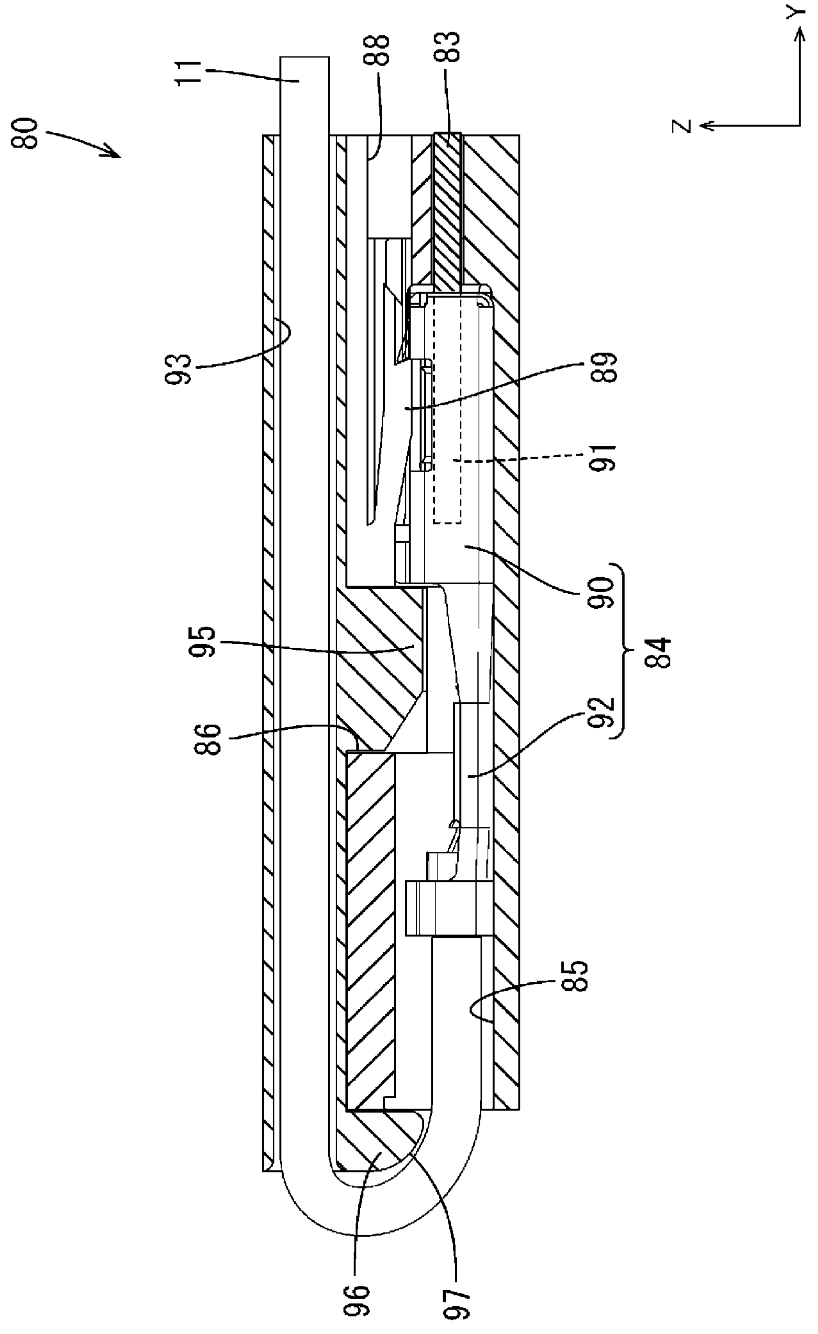
FIG. 15 is a section along XV-XV in FIG. 14.

As shown in FIGS. 14 and 15, with the lower housing 81 and the upper cover 82 assembled, a terminal engaging portion 95 projecting downward is formed at a position of the upper cover 82 corresponding to the cut portion 86 of the lower housing 81. The terminal engaging portion 95 enters the cavities 85 through the cut portion 86 of the lower housing 81 to engage rear end parts of the tube portions 90 of the terminals 84 from behind. In this way, the terminals 84 are held in the cavities 85 not to come out rearward.

As shown in FIG. 15, with the lower housing 81 and the upper cover 82 assembled, the wires 11 drawn out rearward from the lower housing 81 extend upward and are bent forward to extend forward and inserted into the wire holding portions 93 of the upper cover 82. In this way, the wires 11 are held to extend in the front-rear direction in the upper cover 82.

As shown in FIG. 15, with the lower housing 81 and the upper cover 82 assembled, a wire pressing portion 96 projecting downward is provided on a rear end part of the upper cover 82. A lower end part of the wire pressing portion 96 is formed with a curved surface 97. In this way, the wires 11 drawn out rearward from the rear end part of the lower housing 81 are gently bent along the curved surface 97 when being bent upward.

Since the other configuration is substantially the same as in the first embodiment, the same members are denoted by the same reference signs and repeated description is omitted.

According to this embodiment, since the terminals 84 can be retained and held in the cavities 85 by assembling the upper cover 82 with the lower housing 81, the terminals 84 can be firmly held in the cavities 85.

Other Embodiments (1) The wire holding portions may be in the form of grooves.

(2) The wire pressing portion(s) may be omitted.

(3) The joint connector may be configured to connect two, three, five or more wires.

(4) The terminal may be configured to include one, three or more sandwiching portions.

LIST OF REFERENCE NUMERALS

10, 70, 80: joint connector
11: wire
12, 84: terminal
13: core
14: insulation coating
15: terminal body
16: slide portion
17, 90: tube portion (example of busbar connecting portion)
18A: upper sandwiching portion
18B: lower sandwiching portion
19: resilient contact piece
20, 92: wire connecting portion
23A: upper holding protrusion
23B: lower holding protrusion
25A: upper pressurizing portion
25B: lower pressurizing portion
26: partial lock receiving portion
27: full lock receiving portion
28: locking projection
29, 85: cavity
30, 81: lower housing
31: partition wall
32: busbar placing portion
33: lock receiving portion
34: hinge
35: bent portion
37, 93: wire holding portion
46: jig contact portion
47: guiding portion
50, 83: busbar
52, 91: tab
53: relay portion
54: coupling portion
60, 82: upper cover
61: upper wall
63, 95: terminal engaging portion
63F: front terminal engaging portion
63R: rear terminal engaging portion
64: busbar holding portion
65, 96: wire pressing portion
66, 94: lock claw
86: cut portion
87: busbar insertion hole
88: mold removal hole
89: locking lance
97: curved surface

What is claimed is:

1. A joint connector for connecting a plurality of wires, comprising:

the plurality of wires extending in an extending direction;

a plurality of terminals to be respectively connected to front end parts in the extending direction of the plurality of wires;

a lower housing for accommodating the plurality of terminals;

a busbar to be disposed in the lower housing; and an upper cover to be assembled with the lower housing, wherein:

the busbar includes a plurality of tabs, each of the plurality of terminals includes a busbar connecting portion to be connected to each of the plurality of tabs and a wire connecting portion to be connected to each of the plurality of wires, the plurality of wires drawn out rearward in the extending direction from the lower housing include bent portions folded forward in the extending direction, the upper cover includes wire pressing portions for holding the plurality of wires folded forward in the extending direction, the wire connecting portion includes a sandwiching portion extending along the extending direction, the sandwiching portion sandwiching one of the plurality of wires, and a slide portion disposed outside the sandwiching portion, the slide portion being movable along the extending direction, and the slide portion includes a pressurizing portion for pressurizing the sandwiching portion toward the wire with one of the plurality of wires sandwiched by the sandwiching portion, the slide portion is a member separate from the sandwiching portion, the slide portion is slidable between a full locking position and a partial locking position, the slide portion is so configured that the pressurizing portion presses the sandwiching portion at the full locking position, and the sandwiching portion is separated from the pressurizing portion at the partial locking position.

2. The joint connector of claim 1, wherein the upper cover includes a wire pressing portion for pressing the plurality of wires drawn out rearward in the extending direction from the lower housing toward the lower housing.

3. The joint connector of claim 1, wherein the upper cover is coupled to the lower housing via a hinge extending rearward from the lower housing in the extending direction.

4. The joint connector of claim 1, wherein the upper cover includes terminal engaging portions to be engaged with the terminals from behind in the extending direction with the upper cover assembled with the lower housing.

5. The joint connector of claim 1, wherein a busbar holding portion for sandwiching the busbar between the lower housing and the busbar holding portion with the lower housing and the upper cover assembled is provided on an inner surface of the upper cover.

6. The joint connector of claim 1, wherein the wire holding portions are in the form of holes for allowing the wires to be inserted therethrough.

* * * * *